United States Patent [19]

De Luca et al.

[11] Patent Number: 4,730,229

[45] Date of Patent: Mar. 8, 1988

[54] MALE BASE SUBSCRIBER CIRCUIT PROTECTOR MODULE

[75] Inventors: Paul V. De Luca, Plandome Manor; Michael Belle-Oudry, Centereach; Helmuth Neuwirth, Garden City, all of N.Y.; Paul Shaskan, Stamford, Conn.

[73] Assignee: Porta Systems Corp., Syosset, N.Y.

[21] Appl. No.: 874,117

[22] Filed: Jun. 13, 1986

[51] Int. Cl.[4] .................................................. H02H 9/04

[52] U.S. Cl. .................................... 361/119; 361/124; 337/32; 337/34

[58] Field of Search ........ 361/124, 120, 129, 117–119; 337/31–34, 18, 28, 29

[56] References Cited

U.S. PATENT DOCUMENTS 3,889,221 6/1975 Heisinger .......................... 337/34 X

*Primary Examiner*—A. D. Pellinen

*Assistant Examiner*—Todd E. DeBoer

*Attorney, Agent, or Firm*—Charles E. Temko

[57] ABSTRACT

A male base subscriber pair protector module in which substantially all of the internal components thereof are assembled upon an axially elongated base element prior to insertion within a module housing, thereby facilitating manufacture and allowing the use of a wide variety of existing components which are readily adapted for such assembly.

4 Claims, 8 Drawing Figures

MALE BASE SUBSCRIBER CIRCUIT PROTECTOR MODULE

BACKGROUND OF THE INVENTION

This invention relates generally to the field of telephony, and more particularly to an improved male base protector module of a type used for the protection of individual subscriber pairs at the point of appearance on a frame-mounted protector block located in a telephone company office. Devices of this general type are well known in the art, and are manufactured at an annual rate of millions per year. The invention lies in specific constructional details which permit improved ease of assembly and lower cost of manufacture using proven prior art electrical components.

These modules are of generally standardized configuration, in each case including an elongated ground pin extending outwardly from a base element, and either four male pins or female sockets accommodating the usual tip in, tip out, ring in, and ring out sides of the line. Depending upon considerations of cost, the required degree of protection, and other factors, such modules will normally include provision for shorting to ground potential, instantaneous voltage and current surges, as well as a heat sensitive means which fires upon the occurence of a sustained current overload. Although gas tubes are most commonly used in the former means, many replacement modules still employ the older carbon arc elements that have been employed since the turn of the century, particularly in connection with the older type connector blocks employed by local telephone companies in other than urban areas. In the case of such replacements, the consideration of cost is paramount, and protection requirements are less demanding.

One factor which permits the production of such low cost modules is the ability to employ certain components used in the manufacture of more sophisticated modules, thereby gaining the advantage of economies of scale. Another is the ability to assemble these components into a completed module using unskilled or semiskilled personnel, with a minimum of effort on the part of the worker. Experience has shown that this may be most readily accomplished where the module is assembled with all of the electrical components in full view, and in which the main housing element which encloses the elements serves only a shielding function.

SUMMARY OF THE INVENTION

Briefly stated, the invention contemplates the provision of an improved subscriber circuit module of the class described in which the above discussed desiderata are obtained. The module includes a base element of axially elongated configuration having a plurality of axially oriented recesses for accommodating the electrically conductive components in predetermined mutual relation to permit substantially total assembly of the module prior to the insertion of the base element into a hollow rectangularly shaped housing. The male base design allows for assembly of any standard female style module into a male base configuration, with only minor modifications to the long and short contacts.

BRIEF DESCRIPTION OF THE DRAWINGS

In the drawings, to which reference will be made in the specification, similar reference characters have been employed to designate corresponding parts throughout the several views.

DETAILED DESCRIPTION 0F THE DISCLOSED EMBODIMENTS

Figure 1:
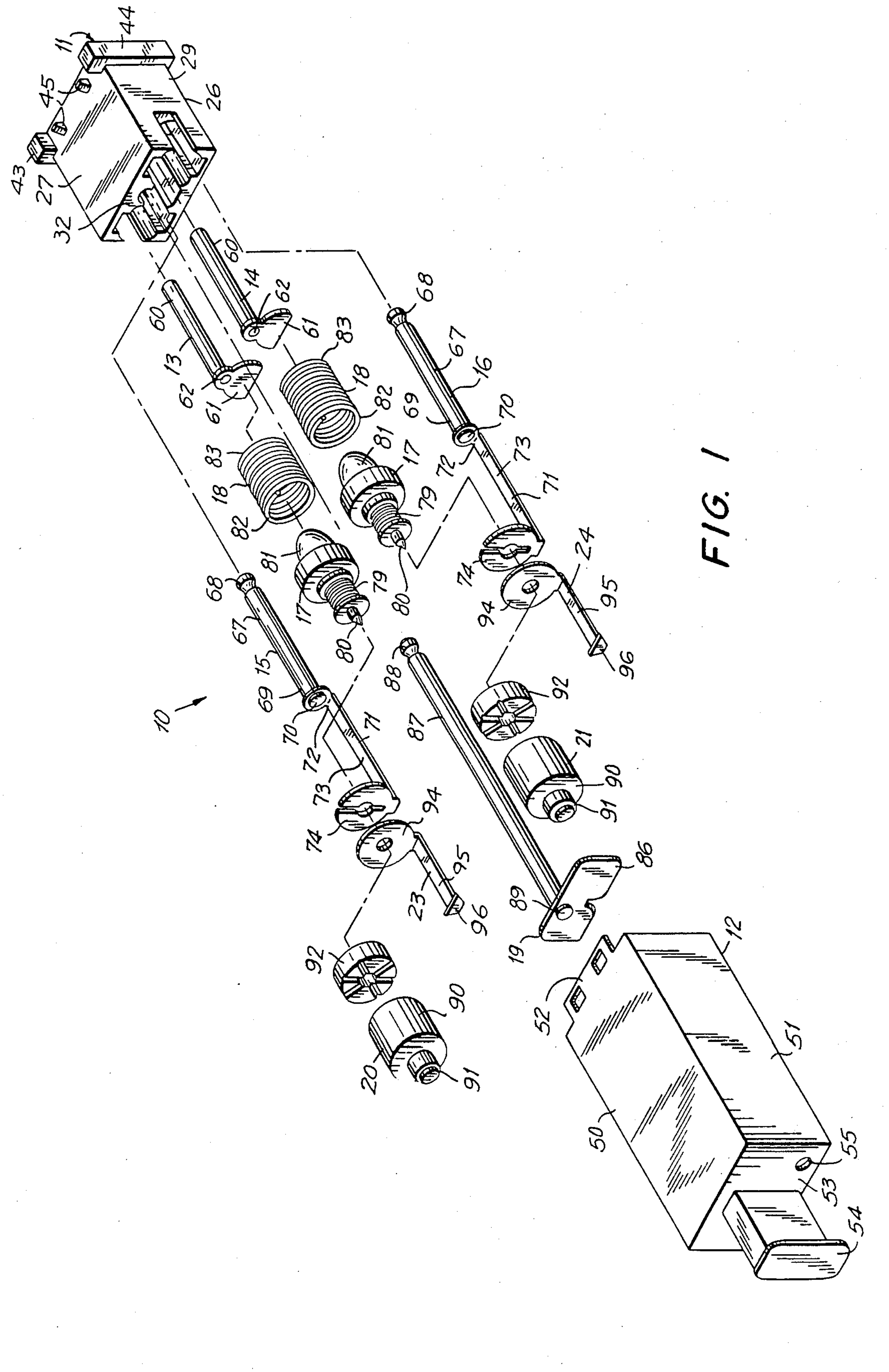
FIG. 1 is an exploded view in perspective of a first embodiment of the invention.
Figure 3:
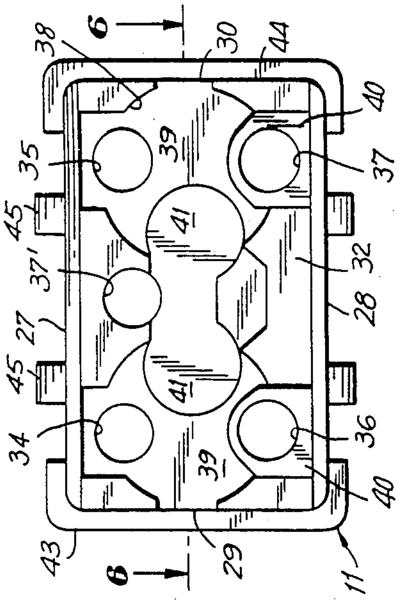
FIG. 3 is an end elevational view of the base element shown in FIG. 2 and showing an opposite end thereof.

In accordance with the first embodiment of the invention, the device, generally indicated by reference character 10, comprises broadly: a base element 11, a housing element 12, a pair of short contact assemblies 13 and 14, a pair of long contact assemblies 15 and 16, a heat coil assemblies 17, and accompanying springs 18, a ground plate assembly 19, a pair of carbon block assemblies 20 and 21, and a pair of test point contacts 23 and 24.

Figure 6:
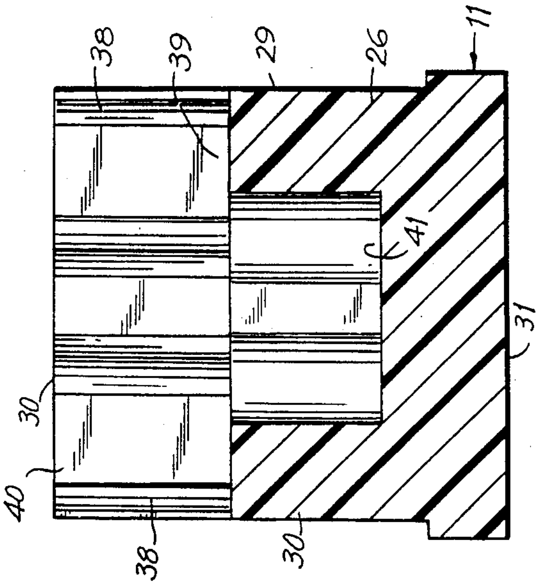
FIG. 6 is a longitudinal sectional view thereof as seen from the plane 6—6 in FIG. 3.
Figure 5:
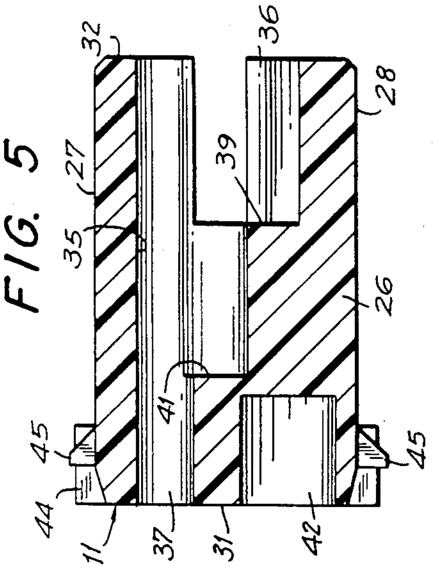
FIG. 5 is a longitudinal sectional view of the base element as seen from the plane 5—5 in FIG. 2.
Figure 7:
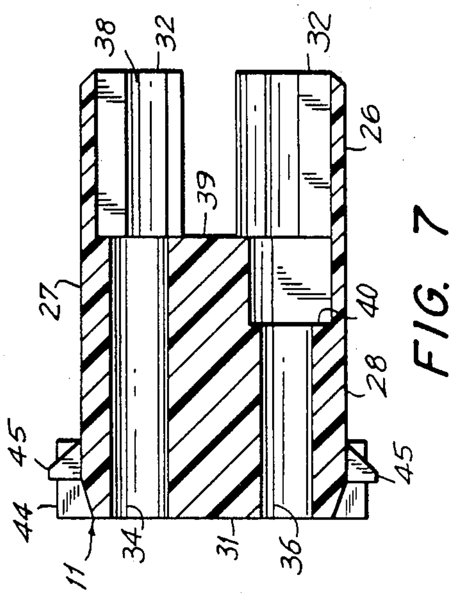
FIG. 7 is a longitudinal sectional view thereof as seen from the plane 7—7 in FIG. 3.
Figure 2:
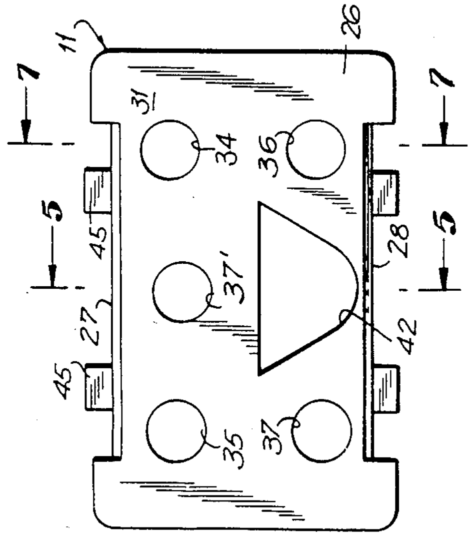
FIG. 2 is an end elevational view of a base element forming a part of the embodiment.
Figure 4:
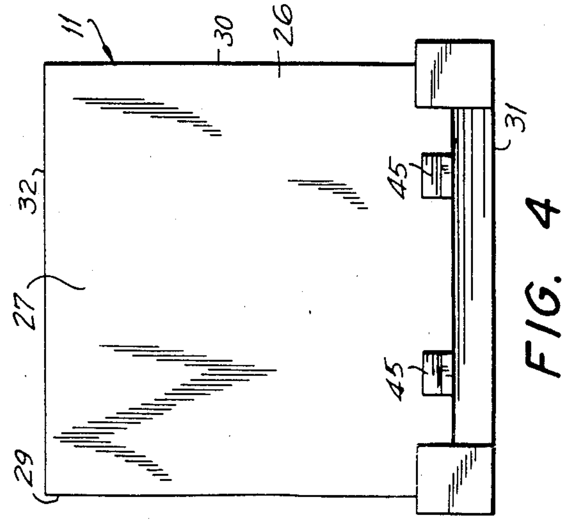
FIG. 4 is a side elevational view of the base element.

The base element 11 is preferably formed from synthetic resinous materials as an injection moulding, and includes a main body 26 bounded by first and second wider side surfaces 27 and 28, narrower side surfaces 29 and 30, an outer end surface 31, and an inner end surface 32. Extending from the surface 32 are first and second short contact bores 34 and 35, third and forth long contact bores 36 and 37, a fifth ground pin bore 37', and a larger symmetrically shaped counter bore 38. The bore 38 is adapted to support several of the internal component parts, and forms first shoulders 39 for the short pin contact assemblies, shoulders 40 for the long contact assemblies (see FIG. 7), shoulders 41 for the heat coil assembly (see FIGS. 5 and 6) and an alignment recess 42 for an engaged protector block (not shown).

The outer end of the base element is provided with a pair of peripheral flanges 43 and 44, and plural projecting enlargements 45 for engagement with the housing element 12.

The housing element 12 is of generally conventional configuration, and is also preferably formed by injection moulding techniques. It includes a pair of wider sides, one of which is indicated by reference character 50, a pair of narrower sides, one of which is indicated by reference character 51, projecting portions 52 which engage the projections 45, as well as an outer wall 53 supporting a manually engageable handle 54 and providing openings, one of which is indicated by reference character 55 for access to test points.

The short contact assemblies 13 and 14 are similar, each including a longitudinally extending pin portion 60 and a laterally extending flange portion 61 which is staked upon the pin portions 60 at 62.

The long contact assemblies 15 and 16 are somewhat similar, and include a pin portion 67 having an outer end terminating in detent means 68, as well as an inner end 69 forming a staked portion 70 to support an elongated flange member 71. The member 71 includes a staked end 72, a longitudinally extending portion 73, and a transversely extending contact 74.

The heat coil assemblies 17 are generally conventional, including a wire-wound bobbin 79 mounting a resiliently urged ground point 80, as well as a conical cap 81. The spring 18 includes an inner end 82 engaging the cap 81, and an outer end 83 which is seated in the bore 38 against the shoulder 39.

The ground plane assembly 19, again, is of conventional construction, including a ground pin 87 having an outer end 88 forming a detent as well as an inner end 89 which is staked to engage a planar ground plane member 86.

The carbon block assemblies 20 and 21 include the usual ceramic sleeve 90 mounting cylindrical carbons 91 in spaced gap forming relation to flat carbons 92. The test point contacts 23 and 24 surround the carbon block assemblies, each including a base member 94, a longitudinally extending member 95 and a probe contact member 96.

From a consideration of FIG. 1, it will be apparent that with all of the above described assemblies in assembled condition, the assembly of the device 10 is readily accomplished by merely inserting the various components into the corresponding bores provided for them with proper positioning being accomplished by engagement with various transversely extending shoulders within the base element. The entire assembly is completed prior to engagement of the housing element 12 upon the base element 11.

Turning now to the second embodiment of the invention, generally indicated by reference character 110, certain corresponding parts have been designated by similar reference characters with the additional prefix "1" thereby avoiding needless repetition.

Figure 8:
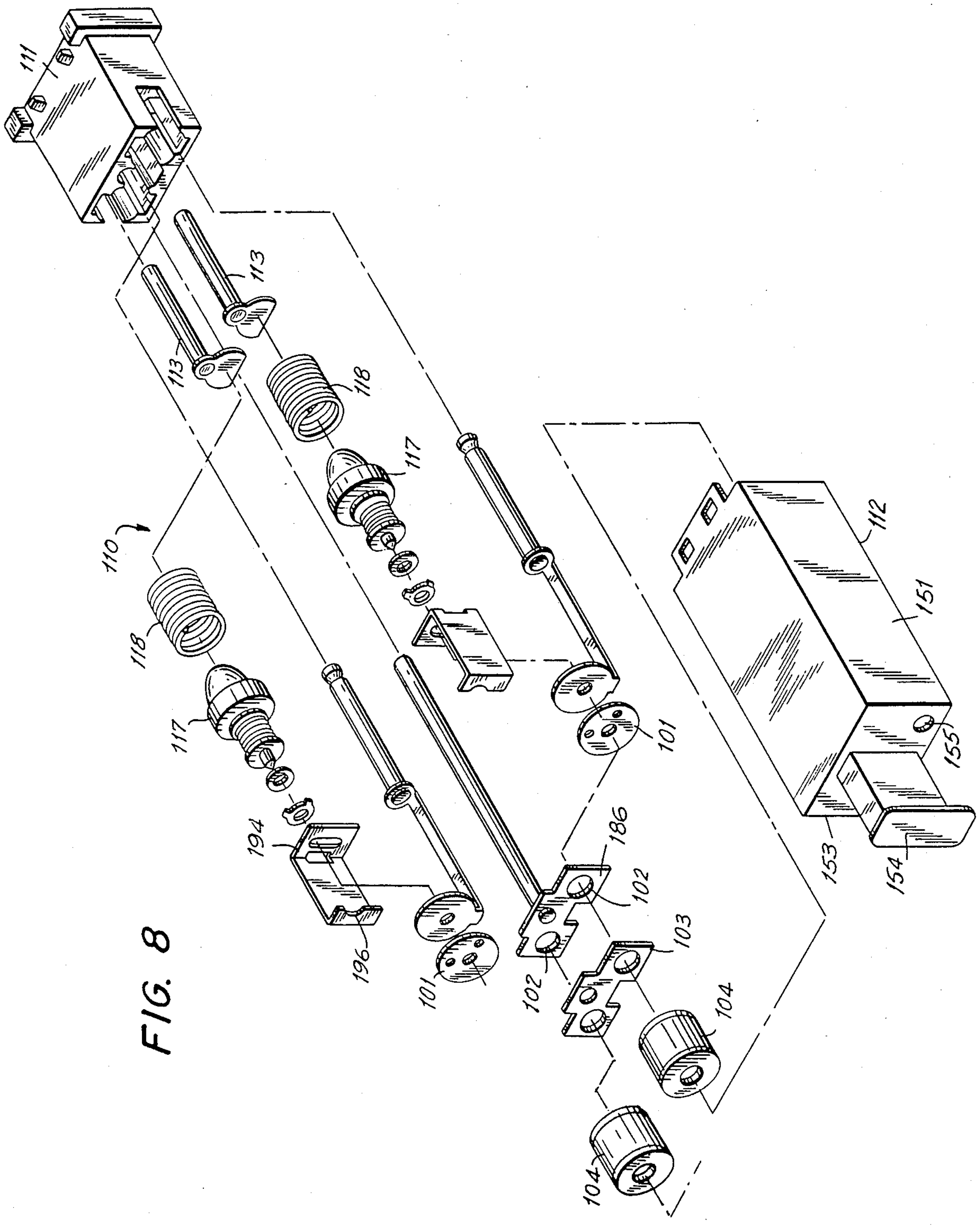
FIG. 8 is an exploded view in perspective similar to that seen in FIG. 1, showing a second embodiment of the invention

The second embodiment, as may be observed from a consideration of FIG. 8, differs from the first embodiment largely in the substitution of more sophisticated components for obtaining protection. In lieu of the carbon arc protective devices, there are provided pairs of air gap insulators 101 positioned on one side of the ground plane. The ground plane is provided with openings 102 for the heat coil 117, and a fusable solder plate 103 of known type underlies a pair of gas tubes 104. It will be observed that assembly of the second embodiment is accomplished in the same manner as with the first embodiment, all of the components being assembled on the base element 111 prior to insertion into the housing element 112.

We wish it to be understood that we do not consider the invention to be limited to the precise details of structure shown and set forth in this specification, for obvious modifications will occur to those skilled in the art to which the invention pertains.

We claim:

1. An improved protector module comprising: an axially elongated molded base element and a housing element selectively engageable upon said base element; said base element having an inner transverse surface and an outer transverse surface and a plurality of bores extending in mutually parallel relation from said outer surface to a point medially positioned relative to said inner and outer surfaces; a corresponding plurality of counterbores extending from said inner surface to a point medially positioned relative to said inner and outer surfaces in parallel alignment relative to said plurality of bores; a plurality of contact pin assemblies, one said assembly positioned within each of said plurality of bores, each of said asemblies including an elongated contact pin having inner and outer ends, and a laterally extending enlargement on said inner end positioned within a respective counterbore; said base element having a single through bore extending between said inner and outer surfaces, a ground pin assembly including a ground pin extending through said single bore; said base element having another bore of non-circular cross sectional configuration extending from said inner surface to a plane medially disposed relative to said inner and outer surfaces; a pair of heat coil assemblies positioned in mutually parallel relation within said another bore, said heat coil assemblies including a resilient component electrically communicating with said ground pin, and momentary excess current surge protection means positioned between said ground pin assembly and some of said contact pin assemblies.

2. An improved protector module in accordance with claim 1, further characterized in said current surge protection means including a carbon arc protector assembly.

3. An improved protector module in accordance with claim 1, further characterized in said ground pin assembly including a transversely extending ground plane on an inner end of said ground pin, a fusible solder plate overlying said ground plane on a first surface thereof, and a gas tube element overlying said solder plate.

4. An improved protector module in accordance with claim 3, further comprising: an air gap insulator overlying a contact pin assembly and contacting an opposite surface of said ground plane, a C-shaped contact member communicating with said heat coil member at one end thereof, and a distally located conductor surface on said gas tube serving to bypass said gas tube on firing of said heat coil assembly.

* * * * *